(12) United States Patent
Neelakantan et al.

(10) Patent No.: US 8,402,859 B2
(45) Date of Patent: Mar. 26, 2013

(54) BARREL CAM SHIFT MECHANISM

(75) Inventors: Vijay A. Neelakantan, Rochester Hills, MI (US); Bret M. Olson, Whitelake, MI (US); Jesse B. Bradley, Royal Oak, MI (US); Ajit S. Grewal, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 463 days.

(21) Appl. No.: 12/612,498

(22) Filed: Nov. 4, 2009

(65) Prior Publication Data
US 2011/0100144 A1 May 5, 2011

(51) Int. Cl.
B60K 20/00 (2006.01)
F16H 59/04 (2006.01)
F16H 59/00 (2006.01)
F16H 61/00 (2006.01)
F16H 63/00 (2006.01)

(52) U.S. Cl. .................................. 74/473.36; 74/337.5

(58) Field of Classification Search ............... 74/337.5, 74/339, 340, 325, 330, 331, 473.36, 473.21, 74/473.23
See application file for complete search history.

(56) References Cited

U.S. PATENT DOCUMENTS

| | | | | |
|---|---|---|---|---|
| 4,713,979 A * | 12/1987 | Muto et al. | .................... | 74/337.5 |
| 4,879,919 A * | 11/1989 | Sekizaki | ....................... | 74/337.5 |
| 6,370,976 B1 * | 4/2002 | Doppling et al. | ............ | 74/337.5 |
| 6,789,440 B2 * | 9/2004 | Bigi | .............................. | 74/337.5 |
| 6,851,326 B2 * | 2/2005 | Wild et al. | ....................... | 74/335 |
| 7,116,006 B2 * | 10/2006 | McCoin | ........................... | 290/54 |
| 7,363,834 B2 * | 4/2008 | Kapp et al. | .................... | 74/337.5 |
| 8,037,779 B2 * | 10/2011 | Shiozaki et al. | ............ | 74/473.36 |
| 8,042,419 B2 * | 10/2011 | Mizuno et al. | ............... | 74/337.5 |
| 8,042,420 B2 * | 10/2011 | Tsunashima et al. | ......... | 74/337.5 |
| 8,109,166 B2 * | 2/2012 | Tsukada et al. | .................. | 74/330 |
| 8,127,635 B2 * | 3/2012 | Tsukada et al. | ................. | 74/331 |
| 2008/0220936 A1 * | 9/2008 | Kobayashi et al. | .............. | 477/70 |

FOREIGN PATENT DOCUMENTS

EP  1118804 A2 *  7/2001

* cited by examiner

*Primary Examiner* — Troy Chambers
*Assistant Examiner* — Michael Gonzalez

(57) ABSTRACT

A shift mechanism for a dual clutch transmission employs a rotating barrel cam having at least three tracks which are engaged by and translate at least three associated cam followers. The cam followers extend from shift fork bodies which slide on rails and include shift forks which bi-directionally translate at least three synchronizer clutches which engage at least five forward gears or speeds and reverse. A single electric motor and gear train drive the barrel cam.

20 Claims, 4 Drawing Sheets

BARREL CAM SHIFT MECHANISM

FIELD

The present disclosure relates to a barrel cam shift mechanism for transmissions and more particularly to a single motor driven barrel cam shift mechanism for actuating shift forks in a dual clutch transmission.

BACKGROUND

The statements in this section merely provide background information related to the present disclosure and may or may not constitute prior art.

Shift mechanisms for motor vehicle transmissions take many forms. In a typical manual transmission, a plurality of parallel shift rails are acted upon by an operator guided shift lever and include shift forks which engage and translate synchronizers and clutches which achieve a desired gear. In automatic transmissions, hydraulically operated clutches and brakes controlled by a plurality of logic and control valves engage, disengage and brake elements of planetary gear assemblies. In a newer transmission type, the dual clutch transmission (DCT), a plurality of synchronizer clutches on two countershafts are translated into and out of engagement by associated actuators.

Such dual clutch transmissions typically have five, six or seven forward gears or speeds and reverse. In a typical dual clutch transmission having five forward gears and reverse, at least three actuators, three shift linkages and three double synchronizer clutches will be required. The actuators which will typically be bi-directional, electric or hydraulic devices will generally be the most expensive components of the shift assembly. In a typical six speed, dual clutch transmission, at least four actuators, shift linkages and three double synchronizers clutches and one single synchronizer clutches will be required. Again, the actuation control system will generally be the most expensive component of the shift assembly.

Because of their excellent fuel economy and sporty performance which parallels that of a manual transmission, dual clutch transmissions are gaining recognition and acceptance in the marketplace. Given this trend, activity directed to enhancing all aspects of dual clutch transmission design and operation is ongoing and the present invention is the result of such activity.

SUMMARY

The present invention provides a shift mechanism for a dual clutch transmission employing a rotating barrel cam having a plurality of tracks which are engaged by and translate at least three associated cam followers. The cam followers extend from shift fork bodies which slide on rails and include shift forks which bi-directionally translate at least three synchronizer clutches which engage up to five forward gears or speeds and reverse. A single electric or hydraulic motor and gear train drive the barrel cam. An additional cam track, follower and synchronizer clutch can be added to accommodate, for example, different transmission configurations or transmissions having additional forward gears or speeds.

Thus it is an object of the present invention to provide a barrel cam shift mechanism for a dual clutch transmission.

It is a further object of the present invention to provide a shift mechanism for a dual clutch transmission having up to five forward gears or speeds and reverse.

It is a still further object of the present invention to provide a barrel cam shift mechanism for a dual clutch transmission having at least three tracks and followers.

It is a still further object of the present invention to provide a barrel cam shift mechanism for a dual clutch transmission having a single electric or hydraulic motor and gear train.

It is a still further object of the present invention to provide a barrel cam shift mechanism having a skip shift capability for a dual clutch transmission.

It is a still further object of the present invention to provide a barrel cam shift mechanism for a dual clutch transmission having a plurality of shift rails, shift forks and synchronizer clutches.

It is a still further object of the present invention to provide a barrel cam shift mechanism having a variable track profile for a cam follower that is dependent on the direction of rotation of the barrel cam which provides a skip shift capability.

It is a still further object of the present invention to provide a barrel cam shift mechanism having direction sensitive steps and ramps in the cam profile which provide a skip shift capability in a dual clutch transmission having a single barrel cam.

It is a still further object of the present invention to provide a barrel cam shift mechanism having a direction sensitive gate mechanism in a cam track which provides a direction sensitive variable cam profile which provides a skip shift capability in a dual clutch transmission having a single barrel cam.

Further objects, advantages and areas of applicability will become apparent from the description provided herein. It should be understood that the description and specific examples are intended for purposes of description only and are not intended to limit the scope of the present disclosure.

DRAWINGS

The drawings described herein are for illustration purposes only and are not intended to limit the scope of the present disclosure in any way.

Figure 3:
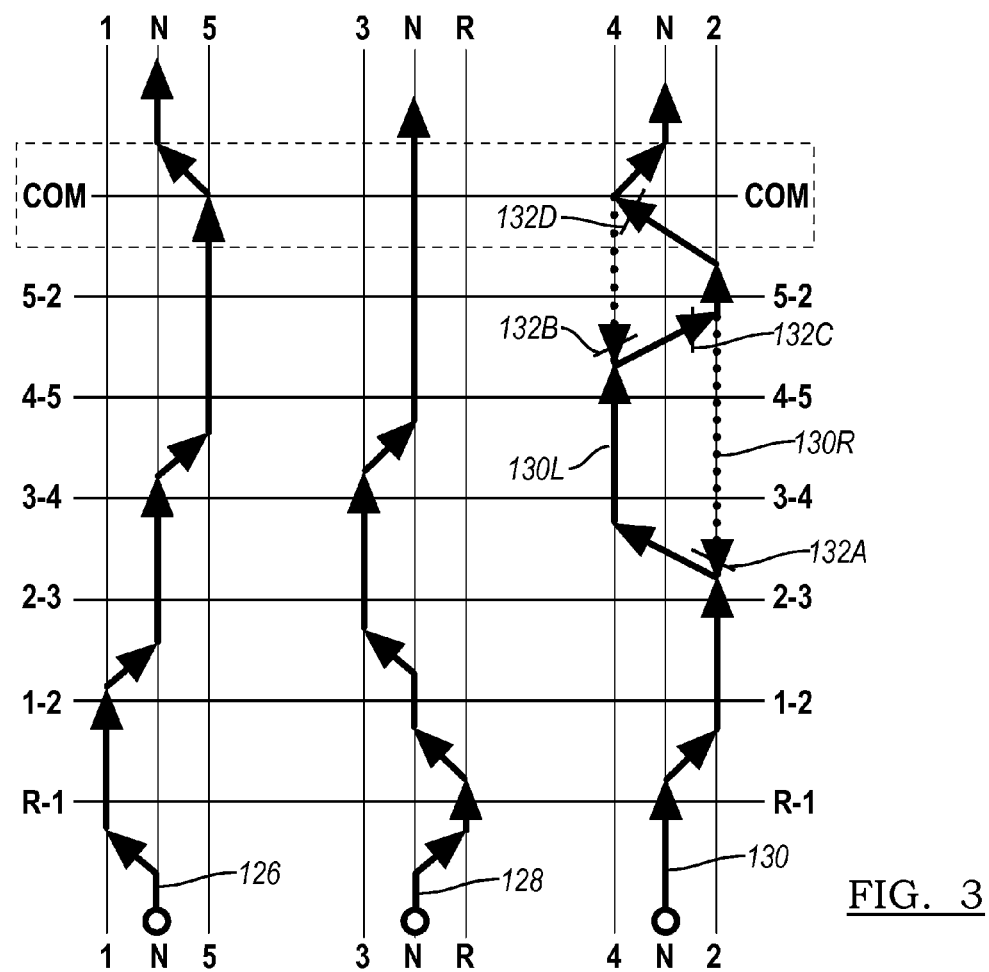
FIG. 3 is a flat pattern layout of the three cam tracks of a barrel cam utilized in a barrel cam shift assembly according to the present invention.
Figure 6:
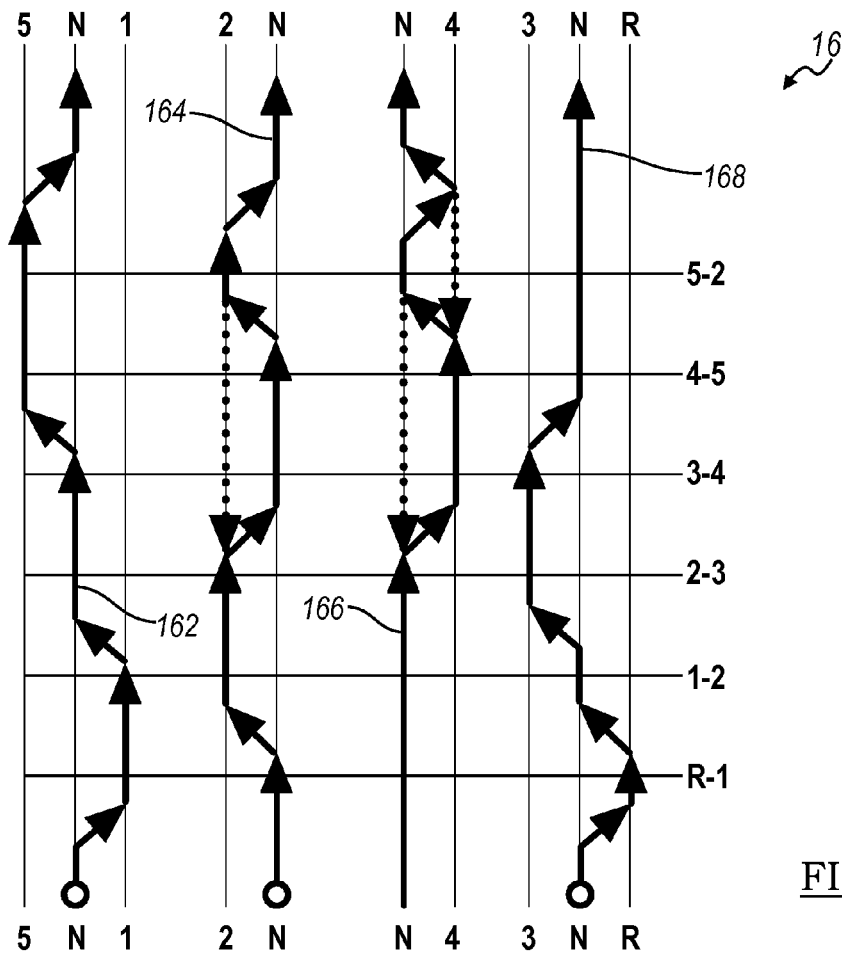
Figure 7:
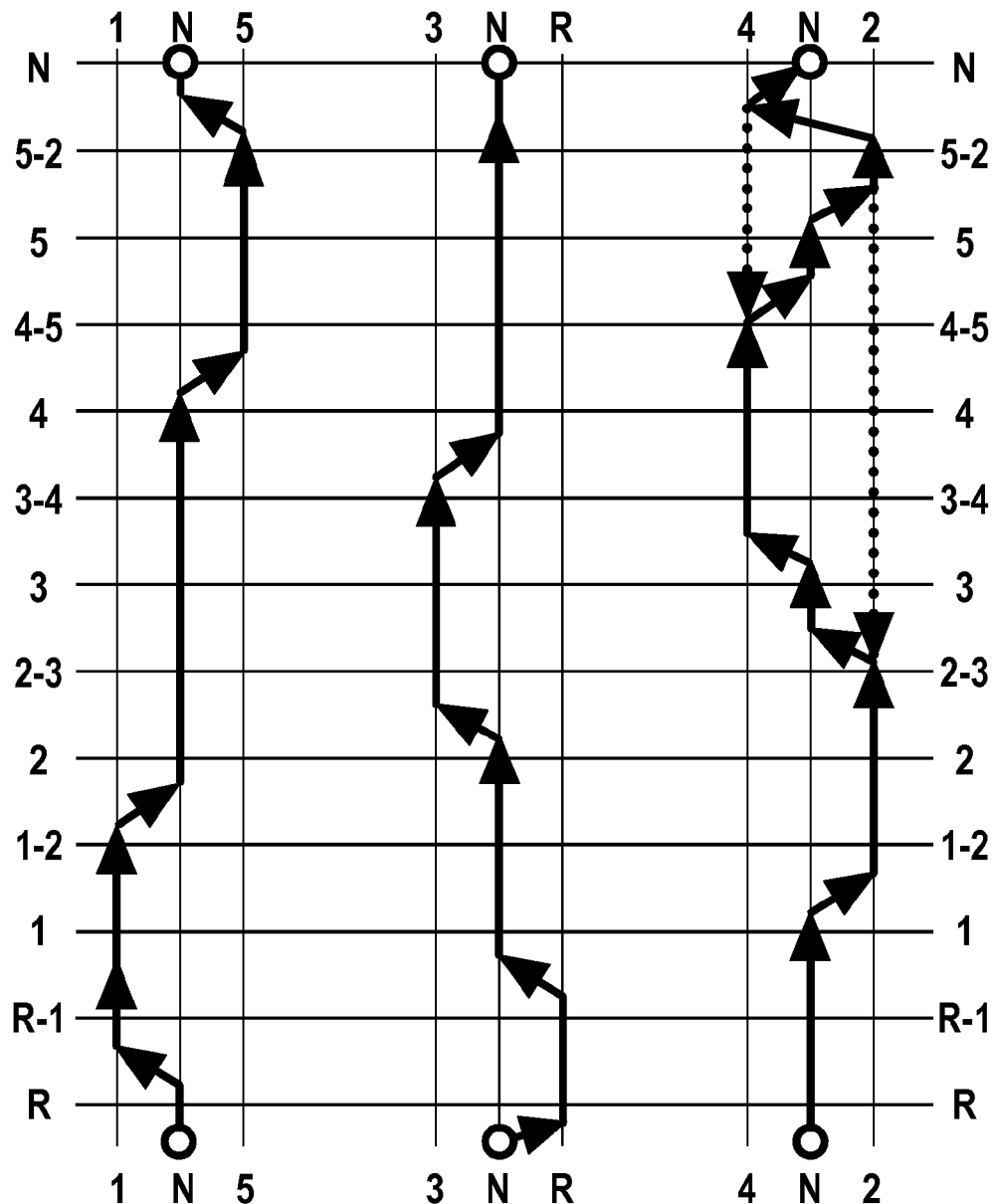

FIG. 6 is an alternate flat pattern layout of four cam tracks of a barrel cam utilized in a barrel cam shift assembly according to the present invention; and FIG. 7 is an alternate flat pattern layout of three cam tracks of a barrel cam utilized in a barrel cam shift assembly according to the present invention which is similar to the layout of FIG. 3 but which includes gear states without any preselection.

DETAILED DESCRIPTION

Figure 1:
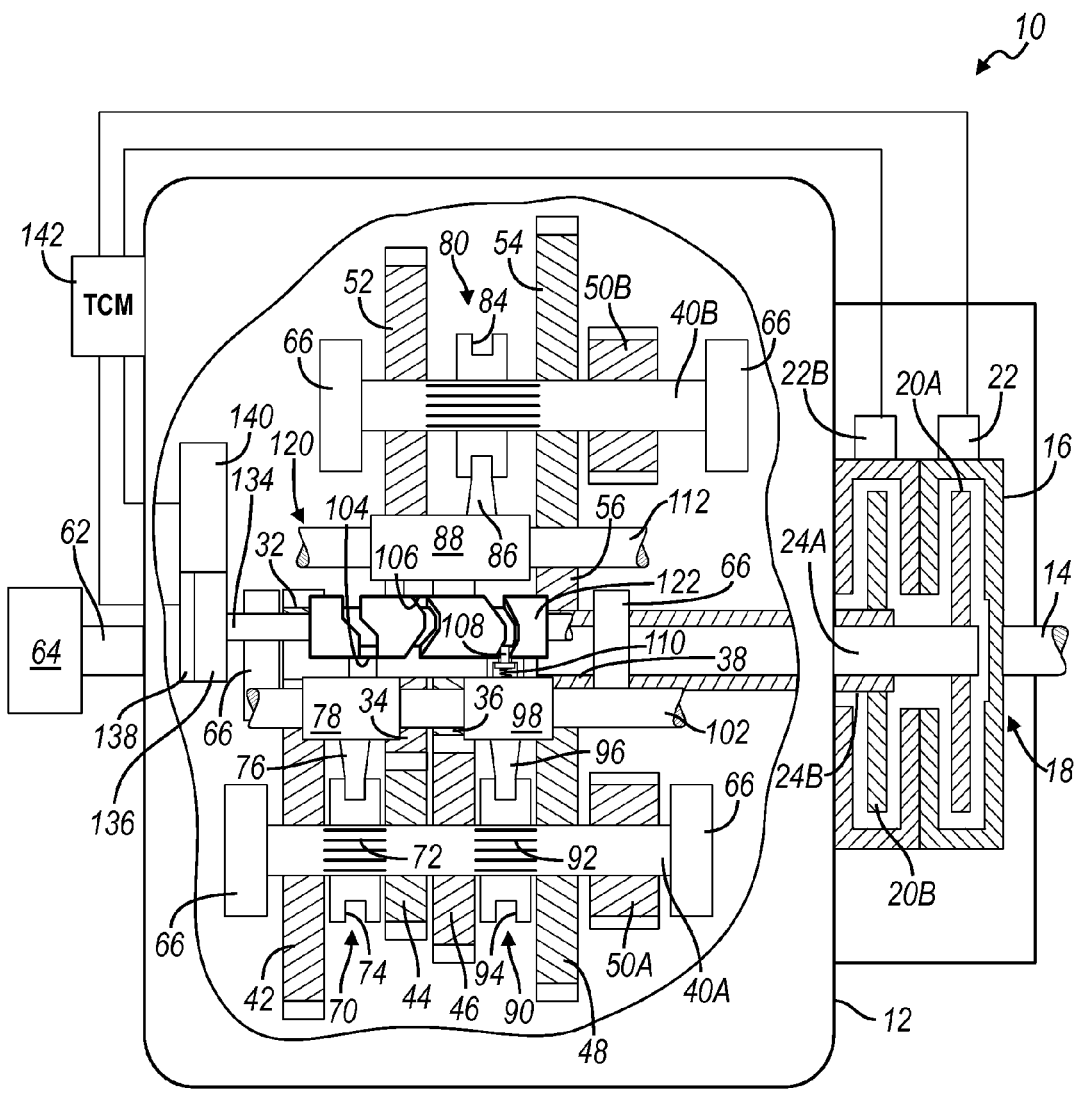
FIG. 1 is a diagrammatic top plan view of a five speed dual clutch transmission incorporating a barrel cam shift assembly according to the present invention.

The following description is merely exemplary in nature and is not intended to limit the present disclosure, application, or uses. In FIG. 1, it should be appreciated that certain components have been rotated out of their actual positions and into the viewing plane for reasons of clarity.

With reference to FIG. 1, a dual clutch transmission incorporating a barrel cam shift mechanism according to the present invention is illustrated and generally designated by the reference number 10. The dual clutch transmission 10 includes a housing 12 having a plurality of bores, openings, flanges and the like which receive, locate and retain the components of the transmission 10. An input shaft 14 is coupled to and driven by a prime mover (not illustrated) such as a gasoline, Diesel, hybrid or electric power plant. The input shaft 14 is coupled to an input or housing 16 of a dual clutch assembly 18. The dual clutch assembly 18 includes a pair of input clutches, a first input clutch 20A and a second input clutch 20B which are commonly driven by the housing 16. The dual clutch assembly 18 may also include a flywheel type vibration absorbing device (not illustrated). The pair of input clutches 20A and 20B are controllably engaged or disengaged by a respective pair of hydraulic, electric, or pneumatic actuators or operators 22A and 22B. The controlled output of the first input clutch 20A drives a first drive shaft 24A and the controlled output of the second input clutch 20B drives a second, concentrically disposed quill, drive tube or hollow shaft 24B.

One of the features and benefits of dual clutch transmissions is the speed of an adjacent gear shift, e.g., a second gear to third gear upshift. Exceedingly rapid shifts are possible because the gear that is next to be engaged (third, for example) can be preselected or prestaged by synchronizing and connecting it to its countershaft. Actual engagement then involves only opening the input clutch associated with the currently engaged gear (second, for example) and engaging the input clutch associated with the new, desired gear (third). This feature requires that the gears be arranged so that adjacent gears (for example, first and second, second and third) are not driven by the same input clutch. For example, first, third and fifth gears, the odd numbered gears, are arranged so that they are driven by one clutch and second, fourth and sixth gears, the even numbered gears, are driven by the other clutch—thereby permitting alternation of the active input clutches as a normal upshift progression through the gears occurs.

The dual clutch transmission 10 is configured to operate in this manner. On the first drive shaft 24A is a first drive gear 32 and a larger, second drive gear 34. The first drive gear 32 and the second drive gear 34 are coupled to and driven by the first drive shaft 24A. On the second quill or drive tube 24B are a third drive gear 36 and a smaller, fourth drive gear 38. The third drive gear 36 and the fourth drive gear 38 are coupled to and driven by the second quill or drive tube 24B.

A first countershaft or driven shaft 40A receives four freely rotating gears which are disposed in two, spaced-apart pairs. Each of the four gears is in constant mesh with one of the drive gears 32, 34, 36 or 38. A first large, driven gear 42 which provides the largest speed reduction and corresponds to first gear is in constant mesh with the first drive gear 32 on the first drive shaft 24A. A second, smallest driven gear 44 provides the smallest speed reduction and corresponds to the highest gear, in this case, fifth gear. The ratio provided by the second driven gear 44 may be 1:1 or the second driven gear 44 may provide overdrive. The second driven gear 44 is in constant mesh with the second drive gear 34 on the first drive shaft 24A. A third, intermediate size driven gear 46 provides an intermediate speed ratio which corresponds to fourth gear. The third driven gear 46 is in constant mesh with the third drive gear 36 on the second quill or drive tube 24B. A fourth intermediate size driven gear 48 provides another intermediate speed ratio which corresponds to second gear. The fourth driven gear 48 is in constant mesh with the fourth drive gear 38 on the second quill or drive tube 24B. A first output gear 50A is coupled to and driven by the first countershaft or driven shaft 40A.

A second countershaft or driven shaft 40B receives two freely rotating gears which are disposed in a spaced-apart pair. Each of the gears is in constant mesh with a drive gear. A fifth, smaller driven gear 52 provides another intermediate speed ratio which corresponds to third gear. The fifth driven gear 52 is in constant mesh with the second drive gear 34 on the first drive shaft 24A. A sixth, larger driven gear 54 provides reverse. A reverse idler gear 56 is in constant mesh with both the sixth driven gear 54 and the fourth drive gear 38 on the second quill or drive tube 24B. A second output gear 50B is coupled to and driven by the second countershaft or driven shaft 40B.

The first output gear 50A and the second output gear 50B mesh with and commonly drive an output gear (not illustrated) which is coupled to and drives an output shaft 62. The output shaft 62, in turn, drives a final drive assembly (FDA) 64 which may include a prop shaft, transfer case, at least one differential, axles and wheels (all not illustrated). The drive shaft 24A and the drive quill 24B as well as the countershafts 40A and 40B are preferably rotatably supported by pairs of ball bearing assemblies 66.

It should be appreciated that the actual numerical gear ratios provided by the driven gears 42, 44, 46, 48, 52 and 54 (and their associated drive gears) are a matter of design choice based upon the actual specifications and desired characteristics of the vehicle and its powertrain. Moreover, it should be appreciated that the arrangement of the gears 42, 44, 46, 48, 52 and 54 on the countershafts 40A and 40B is illustrative only and that they may be disposed in other arrangements with the proviso, stated above, that the gears of adjacent gear ratios, i.e., first and second, fourth and fifth, must be configured so that one input clutch provides one gear and the other input clutch provides the adjacent gear ratio.

Disposed intermediate the first driven gear 42 and the second driven gear 44 is a first double synchronizer clutch 70. The first synchronizer clutch 70 is slidably coupled to the first countershaft 40A by a spline set 72 and rotates therewith. The first synchronizer clutch 70 includes synchronizers and face or dog clutches (not illustrated) which selectively synchronize and then positively couple the first driven gear 42 or the second driven gear 44 to the first countershaft 40A when it is translated to the left or right, as illustrated in FIG. 1. The first synchronizer clutch 70 includes a circumferential channel or groove 74 which is engaged by a first shift fork 76 which extends from a first cylindrical shift fork body 78.

Disposed intermediate the fifth driven gear 52 and the reverse gear 54 is a second double synchronizer clutch 80. The second synchronizer clutch 80 is slidably coupled to the second countershaft 40B by a spline set 82 and rotates therewith. The second synchronizer clutch 80 includes synchronizers and face or dog clutches (not illustrated) which selectively synchronize and then positively couple the fifth driven gear 52 or the reverse gear 54 to the second countershaft 40B when it is translated to the left or right. The second synchronizer clutch 80 includes a circumferential channel or groove 84 which is engaged by a second shift fork 86 which extends from a second cylindrical shift fork body 88.

Disposed intermediate the third driven gear 46 and the fourth driven gear 48 is a third double synchronizer clutch 90. The third synchronizer clutch 90 is slidably coupled to the first countershaft 40A by a spline set 92 and rotates therewith.

The third synchronizer clutch 90 also includes synchronizers and face or dog clutches (not illustrated) which selectively synchronize and then positively couple the third driven gear 46 or the fourth driven gear 48 to the first countershaft 40A when it is translated to the left or right. The third synchronizer clutch 90 includes a circumferential channel or groove 94 which is engaged by a third shift fork 96 which extends from a third cylindrical shift fork body 98.

The first shift fork body 78 and the third shift fork body 98 both define through cylindrical bores which slidably receive a first stationary shift rail or rod 102. The shift fork bodies 78 and 98 are thus free to translate bi-directionally along the first shift rail 102. Those familiar with the art will realize that the fork bodies 78 and 98 can be mounted upon and secured to separate rails in which case the whole fork and rail assembly translates in the bearing pockets during actuation. The first shift fork body 78 includes a first cam or track follower 104 and the third shift fork body 98 includes a third, spring biased cam or track follower 108. The third cam or track follower 108 is biased radially outwardly by a compression spring 110, also illustrated in FIG. 4. It should be realized that other cam follower mechanisms can provide the same functionality. The second shift fork body 88 also defines a through cylindrical bore which slidably receives a second stationary shift rail or rod 112. The second shift fork body 88 is thus free to translate bi-directionally along the second shift rail 112. The second shift fork body 88 includes a second cam or track follower 106.

Figure 2:
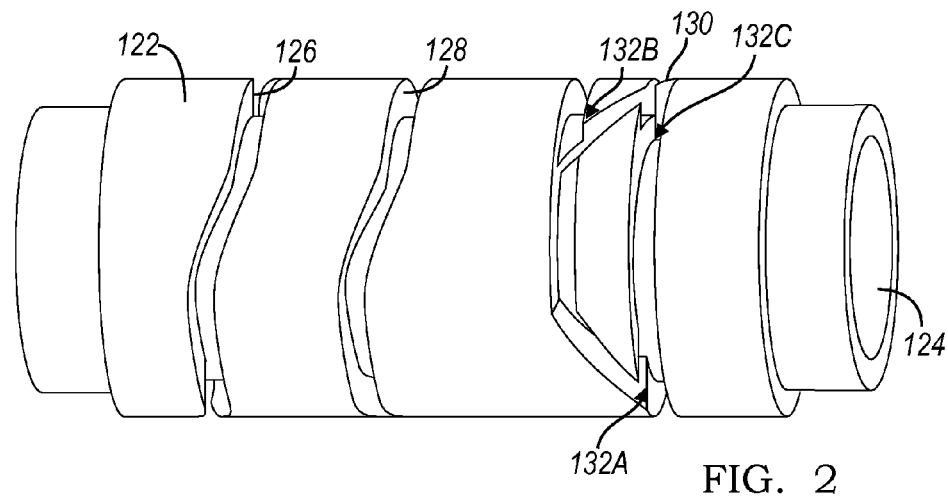
FIG. 2 is an enlarged, plan view of a barrel cam utilized in a barrel cam shift assembly according to the present invention.

Referring now to FIGS. 1 and 2, generally centrally disposed between the first shift rail 102 and the second shift rail 112 is a cylindrical or barrel cam assembly 120. The barrel cam assembly 120 includes a rotating barrel cam 122 defining a through cylindrical opening 124 and having a first cam track 126 which is engaged by the first cam or track follower 104 of the first shift fork body 78, a second cam track 128 which is engaged by the second cam or track follower 106 of the second shift fork body 88 and a third complex cam track 130 which is engaged by the third, spring biased cam or track follower 108 of the third shift fork body 98. The barrel cam 122 is supported for rotation on and secured to a shaft 134 which is coupled to and driven by the output of a speed reduction gear train assembly 136. Disposed proximate or within the gear train assembly 136 in sensing relationship with the shaft 134 is a rotation position sensor 138 which provides data or signals regarding the current rotational position of the shaft 134 and the barrel cam 122. The gear train assembly 136 is, in turn, driven by a bi-directional electric or hydraulic motor 140.

The first clutch operator 22A, the second clutch operator 22B and the electric or hydraulic motor 140 are preferably under the control of a transmission control module (TCM) 142 which is provided with feedback data or signals from the position sensor 138 and other commands such as shift commands. The transmission control module 142 will typically be associated with other vehicle electronic command and operating systems (not illustrated) and may be physically integrated thereinto.

Referring now to FIG. 3, a flat pattern layout of a barrel cam 122 according to the present invention illustrated. At the outset, it should be appreciated that the layout of FIG. 3 presents the shift patterns of the three cam tracks 126, 128 and 130 relative to one another with regard to shift activity. It does not illustrate the actual circumferential locations of the rises and falls of the tracks because these depend upon the circumferential locations of the cam or track followers 104, 106 and 108. That is, if two cam or track followers such as the first cam follower 104 and the third cam follower 108 are disposed on one side of the barrel cam 122 and the second cam follower 106 is disposed on the opposite side of the barrel cam 122, 180° from the other followers 104 and 108, the second (center) cam track 128 would, in fact, need to be rotated or displaced 180° from the location illustrated in FIG. 3, in order to cooperate with the 180° displaced cam follower 106 while still providing the desired shift relationship and sequence.

That said, it will be appreciated that as the barrel cam 122 is rotated by the electric or hydraulic motor 140, it achieves six distinct active positions, each defined or designated by a pair of gear selections, viz., reverse-first, first-second, second-third and so on. This dual designation is the result of three considerations: first, only one of the two designated gears is active or engaged at one time. Second, gear shifts achieved by rotation of the barrel cam 122 only occur with a gear whose associated input clutch 20A or 20B is inactive. Third, the two designated gears are always one gear associated with the first input clutch 20A and another gear associated with the second input clutch 20B. In this way, while one gear (and the associated input clutch) is active, the adjacent gear is inactive and may be changed. As illustrated in FIG. 7, stand alone gear states can be achieved without gear preselection in the other shaft.

Thus, in state reverse-first (R-1 in FIG. 3) the second shift fork body 88 and the second synchronizer clutch 80 are translated to the right to synchronize and connect the sixth driven gear 54 to the second countershaft 40B and the first shift fork body 78 and the first synchronizer clutch 80 are translated to the left to synchronize and connect the first driven gear 42 to the first countershaft 40A. Then, either the second input clutch 20B may be engaged to provide reverse through the fourth drive gear 38, the reverse idler gear 56, the sixth driven gear 54 and the second countershaft 40B or the first input clutch 20A may be engaged to provide first gear through the first drive gear 32, the first driven gear 42 and the first countershaft 40A.

While in first gear, the electric or hydraulic motor 140 may be energized to rotate the barrel cam 122 to the first-second position (1-2 in FIG. 3). During such rotation, the first shift fork body 78 and the first synchronizer clutch 70 remain in position and the first input clutch 20A remains engaged to provide first gear while the third shift fork body 98 translates and the third synchronizer clutch 90 synchronizes and connects the fourth driven gear 48 to the first countershaft 40A. When desired or commanded, the first input 20A clutch is released and the second input clutch 20B is engaged to provide second gear through the fourth drive gear 38 and the fourth driven gear 48.

If the transmission 10 is progressing through a normal upshift sequence, while the fourth driven gear 48 and the second input clutch 20B are engaged providing second gear, the electric or hydraulic motor 140 is energized to rotate the barrel cam 122 to the position second-third (2-3 in FIG. 3). In this position, the second shift fork body 88 has moved to the left and the second synchronizer clutch 80 has synchronized and engaged the fifth driven gear 52 to the second countershaft 40B to provide third gear. Opening the second clutch 20B and engaging the first clutch 20A thus provides third gear.

Once again, while the fifth driven gear 52 is engaged, the barrel cam 122 may be rotated to position third-fourth (3-4). Now the third shift fork body 98 and the third synchronizer clutch 90 translate to the left to synchronize and connect the third driven gear 46 to the first countershaft 40A which will provide fourth gear. Opening the first clutch 20A and engaging the second clutch 20B thus achieves fourth gear. The fifth forward speed of the transmission 10, provided through the second drive gear 34, the second driven gear 44 and the first countershaft 40A, is achieved in a similar fashion by translation to the right of the first shift fork body 78 and the first synchronizer 70, release of the second input clutch 20B and engagement of the first input clutch 20A. The barrel cam 122 may be rotated to a further sixth position 5-2. This position is preparatory to a fifth gear to second gear skip-downshift which may occur when there is a need for very quick vehicle acceleration while in fifth gear. Further rotation of the barrel cam 122 prepares a fifth gear to fourth gear downshift to allow for a sequential downshift. In this case, when in the fourth-fifth (4-5) position, a need for a fifth to second gear skip downshift is initiated; the barrel cam 122 can be rotated to the fifth-second (5-2) position. However, when the driver changes her mind just before the actual clutch-to-clutch shift is completed, it may be required to return to the fourth-fifth (4-5) position. This is achieved by rotating the barrel cam 122 further forward to the Change-Of-Mind (COM) position and then rotating the barrel cam 122 backward to the fourth-fifth (4-5) position from where normal sequential downshifts can occur. This arrangement provides the capability of achieving a fifth to second gear downshift while at the same time allowing for a change of mind situation where the shift assembly can back out of a skip downshift and carry on normal, sequential downshifts. The components which achieve these specialized downshifts will be described directly below.

Figure 4:
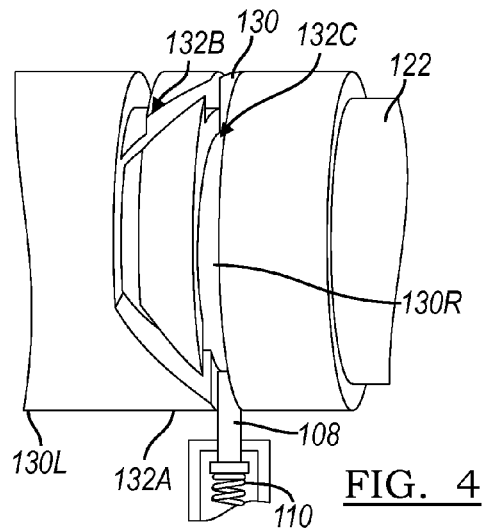
FIG. 4 is an enlarged view of a portion of a cam track of a barrel cam according to the present invention including a direction sensitive step.

With reference now to FIGS. 2, 3 and 4, inspection of the first cam track 126 and the second cam track 128 in FIG. 2 reveals their uniform, bi-directional nature, that is, they define single, continuous tracks which command the same lateral position whether a given location is achieved by clockwise or counter-clockwise rotation of the barrel cam 122. Such is not the case with the third, complex cam track 130. As illustrated in FIGS. 3 and 4, the third cam track 130 includes shoulders or steps which effectively make the third cam track 130 direction sensitive.

A first shoulder or step 132A between positions 2-3 and 3-4 directs the third spring biased cam follower 108 to the left track 130L as it moves from position 2-3 to position 3-4 but directs (allows) the cam follower 108 to move straight along the track 130R to the track 130 in the opposite direction. The left track 130L has a smooth, upward ramp in depth starting from the 2-3 position to the step 132C. The right track 130R has a smooth, upward ramp in depth starting from the 5-2 position to the first shoulder or step 132A. Likewise, a second shoulder or step 132B between positions 4-5 and 5-2 directs the third cam follower 108 from the left track 130L to the right track 130R as it moves from the position 4-5 to the position 5-2 but directs (allows) the cam follower 108 to move straight along the track 130L in the opposite direction. A third shoulder or step 132C, also between positions 4-5 and 5-2, directs the third cam follower 108 from the left track 130L to the right track 130R in one direction of rotation of the barrel cam 122 and ensures that the third cam follower 108 remains in the right track 130R as the third cam follower 108 moves from position 5-2, to position 4-5 and beyond. A fourth shoulder or step 132D is disposed to ensure return of the third cam follower 108 to the left track 130L (and fourth gear) if the barrel cam 122 is rotated beyond the 5-2 position. Thus, depending upon the extent of rotation of the barrel cam 122 which, as noted above is under the control of the transmission control module 142, a downshift from fifth gear to either second gear along the right track 130R or fourth gear along the left track 130L may be accomplished.

Figure 5:
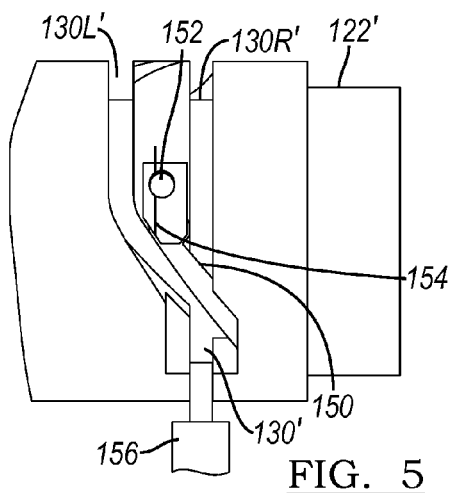
FIG. 5 is an enlarged view of a portion of a cam track of an alternate embodiment barrel cam according to the present invention including a direction sensitive gate.

An alternate construction to the spring biased follower 108 and shoulders or steps 132 is illustrated in FIG. 5. Here, in a third track 130' on a barrel cam 122' and between the cam tracks 130L' and 130R' is disposed a pivoting, spring biased pawl or gate 150. The pawl or gate 150 is mounted for limited, pivoting travel on a pivot pin 152 and biased into the position illustrated in FIG. 5 by a spring 154. The spring 154 may be a leaf spring, a cylindrical spring disposed about the pivot pin 152 or any other configuration providing the appropriate biasing or restoring force to the gate 150. A conventional (non-spring biased) third cam follower 156 is disposed within the third cam track 130'.

The spring biased gate 150 provides the same direction sensitive operation to the third shift fork body 98 and the associated components and may be utilized in the same cam locations as the spring biased follower 108 and the shoulders or steps 132. For example, at the intersection of the left track 130L' and the right track 130R' between the shift positions 2-3 and 3-4, the spring biased gate 150 will direct the third cam follower 156 to the left, to the track 130L' during one direction of rotation of the barrel cam 122' but directs the cam follower 156 straight along the cam track 130R' in the opposite direction of rotation.

FIG. 6 presents an alternative shift pattern 160 having four cam tracks 162, 164, 166 and 168 on a barrel cam such as the barrel cam 122. Essentially, the third track 130 of the embodiment illustrated in FIGS. 1 through 5 associated with second and fourth gears has been separated into two completely independent tracks 164 and 166. Such separation provides improved design and shift flexibility. It should be appreciated that the alternative shift pattern 160, in the tracks 164 and 166, utilizes either the spring biased follower 108 and the shoulders or steps 132 or the spring biased gate 150 at several locations. Thus, when the barrel cam is rotating in a direction that provides upshifts, the cam follower paths and positions and selected gears are represented by the solid black lines of the cam tracks 162, 164, 166 and 168. When, however, the barrel cam is rotating in the reverse direction, the cam follower paths and positions in the cam tracks 164 and 166 and the selected gears are represented by the doted lines.

Referring now to FIGS. 1 and 7, FIG. 7 illustrates an alternate flat pattern layout of three cam tracks of a barrel cam 122 utilized in a barrel cam shift assembly 120 according to the present invention which is similar to the layout of FIG. 3 but which includes gear states without any preselection. Once again, the two cam tracks associated with first and fifth gears and third and Reverse gears are not direction sensitive but the gear state of the third track for second and fourth gears is. In this third (right) track, either the shoulder or step 132A and the spring biased cam follower 108, illustrated in FIG. 4, or the pawl or gate 150, illustrated in FIG. 5, may be utilized to provide direction sensitivity. Thus, in the upper gears, whether second or fourth gear is selected depends upon the direction of rotation and previous activity of the barrel cam 122.

It should thus be appreciated that a dual clutch transmission 10 incorporating the barrel cam shift assembly 120 of the present invention is capable not only of proving a conventional sequence of upshifts with a single barrel cam and electric or hydraulic motor drive assembly but also of providing skip downshifts by virtue of the direction sensitive assemblies illustrated in FIGS. 4 and 5.

The description of the invention is merely exemplary in nature and variations that do not depart from the gist of the invention are intended to be within the scope of the invention. Such variations are not to be regarded as a departure from the spirit and scope of the invention and the following claims.

What is claimed is:

1. A barrel cam shift mechanism for a transmission comprising, in combination, at least one shift fork body disposed for bi-directional translation and having a cam follower, said cam follower having a spring biased member, a barrel cam having at least one cam track for receiving said spring biased member of said cam follower, said cam track having at least one means for directing said cam follower along one portion of said cam track in response to rotation of said barrel cam in one direction and directing said cam follower along another portion of said cam track axially offset from and circumferentially adjacent to said one portion of said cam track in response to rotation of said barrel cam in an opposite direction, and drive means for bi-directionally rotating said barrel cam whereby disposition of said cam follower in said one portion of said track engages a gear distinct from a gear engaged when said cam follower is disposed in said another circumferentially adjacent portion of said cam track.

2. The barrel cam shift mechanism of claim 1 further including at least one synchronizer clutch connected to and translated by said shift fork body.

3. The barrel cam shift mechanism of claim 1 further including at least one countershaft and a plurality of gears disposed on said countershaft.

4. The barrel cam shift mechanism of claim 1 wherein said barrel cam is supported for rotation on a shaft and said shaft is coupled to said drive means.

5. The barrel cam shift mechanism of claim 1 wherein said barrel cam includes a second cam track, a third cam track and an additional means for directing associated with one of said second and third cam tracks.

6. The barrel cam shift mechanism of claim 1 wherein said drive means includes a bi-directional electric motor and a speed reducing gear train.

7. The barrel cam shift mechanism of claim 1 wherein said barrel cam is coupled to a shaft driven by said drive means and said drive means includes a sensor for detecting a rotational position of said shaft.

8. A cam track shift mechanism for a dual clutch transmission comprising, in combination, at least one spaced apart pair of gears and a synchronizer clutch disposed between said pair of gears at least one shift fork body disposed for bi-directional translation, said shift fork body having a fork engaging said synchronizer clutch and a cam follower, a cylindrical cam body having at least one cam track for receiving said cam follower, said cam track defining first and second axially spaced apart and circumferentially adjacent portions and having means for guiding said cam follower toward said first portion of said cam track when said cam follower encounters said guiding means during rotation of said cam body in one direction and guiding said cam follower toward said second portion of said cam track when said cam follower encounters said guiding means during rotation of said cam body in an opposite direction, and a bi-directional electric motor having an output driving a speed reduction assembly having an output driving said cam body.

9. The cam track shift mechanism of claim 8 wherein said cam follower includes a spring biased member.

10. The cam track shift mechanism of claim 8 wherein said guiding means includes a spring biased gate.

11. The cam track shift mechanism of claim 8 further including a countershaft for receiving said pair of gears.

12. The cam track shift mechanism of claim 8 wherein said cylindrical cam body includes a second cam track and a third cam track.

13. The cam track shift mechanism of claim 8 wherein said cam track defines a center neutral position and left and right positions for selecting said gears.

14. A barrel cam shift mechanism for a dual clutch transmission comprising, in combination, at least one synchronizer clutch, at least one shift fork body disposed for axial translation on a rail, said shift fork body having a fork engaging said synchronizer clutch and a cam follower, a barrel cam having at least one cam track for receiving said cam follower, said cam track defining a first portion and a second portion axially spaced apart and circumferentially adjacent said first portion and having direction sensitive means for directing said cam follower along said first portion of said cam track after encountering said direction sensitive means during rotation of said barrel cam in one direction and directing said cam follower along said second portion of said cam track after encountering said direction sensitive means during rotation of said barrel cam in an opposite direction, and a bi-directional electric motor having an output driving a speed reduction assembly having an output driving said barrel cam.

15. The barrel cam shift mechanism of claim 14 wherein said cam track defines a center neutral position, said first portion selects a first gear and said second portion selects a second gear distinct from said first gear.

16. The barrel cam shift mechanism of claim 14 wherein said barrel cam includes a second cam track, a third cam track and a second direction sensitive means associated with one of said second and third cam tracks.

17. The barrel cam shift mechanism of claim 14 wherein said barrel cam includes a second cam track, a third cam track and a fourth cam track.

18. The barrel cam shift mechanism of claim 14 wherein said direction sensitive means includes a spring biased cam follower and at least one step in said cam track.

19. The barrel cam shift mechanism of claim 14 wherein said direction sensitive means includes a spring biased pawl.

20. The barrel cam shift mechanism of claim 14 further including a rotational position sensor operably coupled to said output of said speed reduction assembly.

* * * * *